Figures 1, 2, 3, 4:
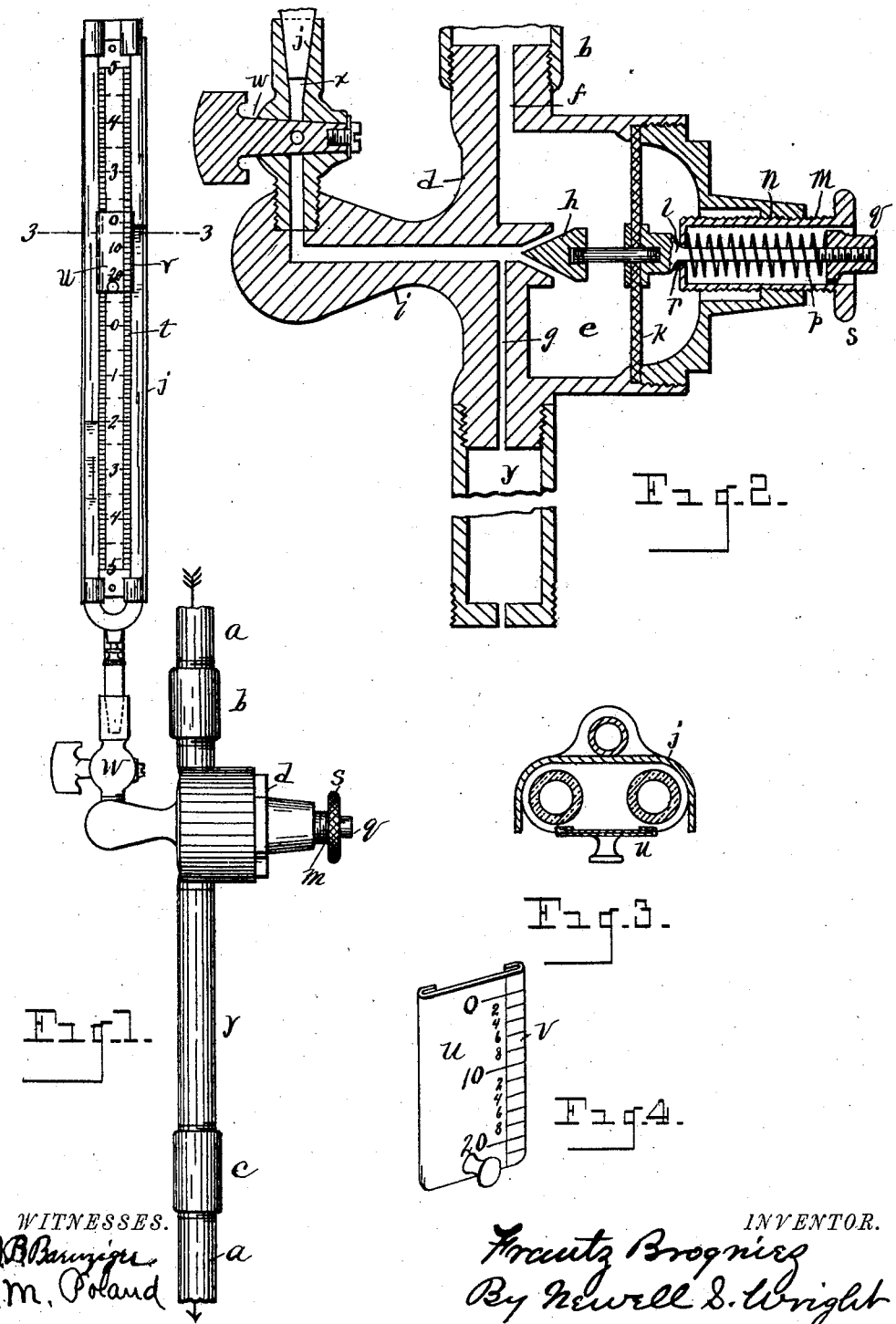

No. 765,548. PATENTED JULY 19, 1904.
F. BROGNIEZ.
AERATING REGULATOR.
APPLICATION FILED NOV. 22, 1901.
NO MODEL. 2 SHEETS—SHEET 1.

WITNESSES. INVENTOR.
Frantz Brogniez
By Newell S. Wright
His Attorney

No. 765,548. PATENTED JULY 19, 1904.
F. BROGNIEZ.
AERATING REGULATOR.
APPLICATION FILED NOV. 22, 1901.
NO MODEL. 2 SHEETS—SHEET 2.
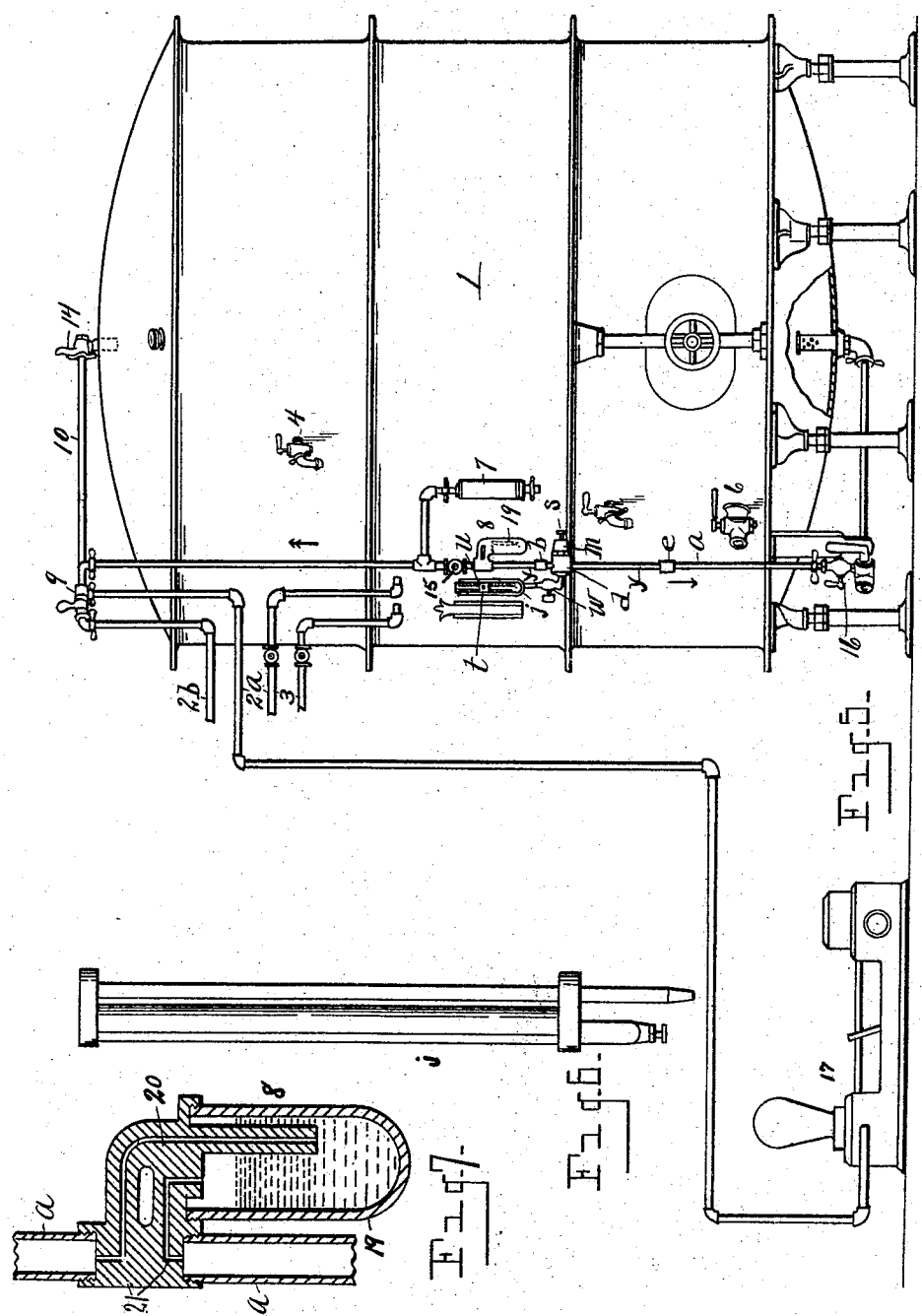
WITNESSES.
INVENTOR.
Frantz Brogniez
By Newell S. Wright
his Attorney No. 765,548. Patented July 19, 1904.

UNITED STATES PATENT OFFICE.

FRANTZ BROGNIEZ, OF DETROIT, MICHIGAN, ASSIGNOR TO PFAUDLER VACUUM FERMENTATION CO., OF ROCHESTER, NEW YORK, A CORPORATION OF NEW YORK.

AERATING-REGULATOR.

SPECIFICATION forming part of Letters Patent No. 765,548, dated July 19, 1904.

Application filed November 22, 1901. Serial No. 83,308. (No model.)

*To all whom it may concern:*

Be it known that I, FRANTZ BROGNIEZ, a citizen of the United States, residing at Detroit, county of Wayne, State of Michigan, have invented a certain new and useful Improvement in Aerating-Regulators; and I declare the following to be a full, clear, and exact description of the invention, such as will enable others skilled in the art to which it appertains to make and use the same, reference being had to the accompanying drawings, which form a part of this specification.

My invention has for its object to regulate the admission of air to liquids during the process of fermentation and to provide an aerating-regulator for carrying out said invention.

My invention is more particularly designed to be employed in connection with the well-known process of vacuum fermentation and in connection with means heretofore employed for carrying out said process.

To this end my present invention consists of the apparatus, its construction, combination, and arrangement, as hereinafter described and claimed, and illustrated in the accompanying drawings, in which—

Figure 1 is a view in side elevation. Fig. 2 is a view in vertical section. Fig. 3 is a view in cross-section on the line 3 3, Fig. 1. Fig. 4 is a detail view of the slide upon the vacuum-gage. Fig. 5 is a view in side elevation, showing my aerating-regulator in place in a well-known vacuum fermentation apparatus. Fig. 6 is a detail view of the gage at right angles to that shown in Fig. 1. Fig. 7 is a vertical section through the "air sight-feed."

Heretofore in carrying out the process of vacuum fermentation there has been no means provided for properly regulating the admission of air during the carrying out of said process. As is well known, the degree of vacuum is not always the same, and the amount of air admitted has heretofore been liable to fluctuate as the degree of vacuum fluctuates.

The purpose of my invention is to provide means to regulate the admission of air to the tank containing the liquid, so as to admit the same amount of air thereto continuously notwithstanding the fluctuations of the degree of vacuum-pressure.

As illustrated in the accompanying drawings, $a\,a$ denote portions of the vacuum suction-pipe customarily employed in carrying out the vacuum fermentation process, as illustrated in connection with the well-known mechanism embodied in Fig. 5, and into and through a portion of which pipe air is received and introduced into the bottom of the tank in any usual manner. Into the suction-pipe $a\,a$ my improved regulator is connected, as by pipe connections, at $b$ and $c$.

The numeral 1 denotes a tank.

10 denotes a suction-pipe, and $2^a\,2^b$ branches of the suction-pipe leading to any suitable means—as to a pump, for example—for producing a suction to draw off the gas forming in the top of the tank through one of said branches and for effecting vacuum-pressure in the tank by exhausting the air through the other of said branches. The numeral 9 denotes a three-way valve controlling communication between the pipes $a$, $2^a$, $2^b$, and 10. The pipe 10 has an independent valve 14, through which said pipe communicates with the interior of the tank, at the top thereof, in a well-known manner. The pipes $a$ and $2^a\,2^b$ have also independent valves 11 12 13, and the pipe 10 has an independent valve 14.

3 3 denote customary pipes for leading brine through the tank for cooling purposes; 4, a customary overflow-pipe; 5, a customary testing-valve, and 6 a racking-valve. Leading into the suction-pipe $a$ is an ordinary air-filter 7, through which air enters said pipe. An ordinary air sight-feed is also indicated at 8, through which the air passes. Above said air sight-feed the pipe $a$ is provided with a valve 15, said pipe being also provided, near the bottom thereof, with a valve 16.

The above-named features are of common construction hitherto employed and except in combination with features hereinafter to be described are not novel, my present invention consisting of the combination therewith of my improved aerating-regulator.

My said aerating-regulator consists, essentially, of a valve-case $d$, forming an interior chamber $e$. Into this chamber communicates an inlet-channel $f$ of the case, while an outlet-channel $g$ of the case leads from said chamber, the communication of the outlet being controlled by a valve $h$, seating in said case. The valve-case is also formed with a channeled arm $i$, upon which may be connected a gage for testing the operation of the regulator. Within the chamber of the valve-case is a flexible diaphragm $k$, with which is engaged in any suitable manner the stem $l$ of the valve. Engaged upon said valve-stem is a thimble or spring-housing $m$, having a threaded engagement with the case, as shown at $n$, the spring $p$ in said thimble being given any desired tension by means of a tension-nut $q$ upon the outer end of the valve-stem. The valve-stem is movable through the inner end of the thimble, as indicated at $r$. The outer end of the thimble is provided with a head $s$ for operating the same.

It will be evident that the operation of the valve may be governed by the operation of the thimble, while the valve may also be operated independently of the thimble by the movement of the flexible diaphragm $k$, caused by vacuum suction. Obviously the suction exerted in the channel $g$ will tend to move the flexible diaphragm inward, thereby tending to close the valve. The spring exerts its tension upon the diaphragm in the direction opposite that of the vacuum suction above described, its tension upon the diaphragm being adjusted to resist or equalize the suction to a desired degree. The air-pump, it will be understood, may be in continuous operation, although its operation may not be uniform. Owing to fluctuation in the operation of the pump and other causes, the vacuum-pressure is liable to increase or decrease; but my invention is intended to secure a uniform supply of air into the bottom of the tank to pass through the fermenting liquid however the vacuum-pressure may fluctuate. It will be seen that when the vacuum suction is increased sufficiently to overcome the tension of the spring the valve will tend to close, thereby diminishing the supply of air received by suction into the channel $g$ and then discharged into the tank, while, on the other hand, when the vacuum suction diminishes the spring will open the valve wider to admit more air into the channel $g$. The valve $h$ also governs the communication of the channeled arm $i$ with the valve-chamber. The gage $j$ may be any customary siphon-gage provided with the usual scale $t$, as shown. My invention in this connection contemplates simply locating upon the face of the customary scale of the gage in any suitable manner a movable indicator-slide $u$, provided with scale-marks $v$, as shown, arranged to show the reading above and below the zero-line of the scale $t$. I prefer to provide the arm $i$ with a suitable valve or petcock $w$, having a socket $x$ to receive the base of the gage, said base and socket having a ground joint connection; but the gage may be engaged upon said arm in any suitable manner. With the valve-case is preferably connected an expansion or equalizing chamber $y$, into which the channel $g$ communicates. The expansion-chamber tends to overcome or prevent pulsations of the suction in the pipe $a\,a$. I do not limit myself to any specific sizes of the channeled parts of the valve-case. By this construction when the vacuum suction is greater than normal or than that desired no more air is received than before, and when the suction is less than normal or than is desired the same amount of air is still supplied. The gage shows the reduction of the degree of vacuum by the inlet of air. It will not be necessary to equip each regulator with a permanent gage, as one gage may answer to test a number of regulators. The sliding scale on the gage is to be set on the point indicating the highest degree of vacuum produced or the degree of vacuum produced when no air passes to the liquid. Obviously no air passes when the valve $h$ is closed. If it is desired to admit a given quantity of air to the liquid in the tank—say, for example, two cubic feet per hour—the amount would be governed by properly adjusting the spring which works against the diaphragm $k$, and whereby more or less air may be admitted, as may be desired. The diaphragm and the spring are normally balanced all the time when the spring is adjusted for a given supply of air, the degree or amount of aeration being indicated by the siphon or vacuum gage. In order to supply that given amount of aeration, the apparatus requires no further attention after having once been adjusted, as the regulator will keep the same supply of aeration all the time whether the suction rises or falls. It will be obvious that to properly read upon the gage $j$ the amount of aeration going on the degrees of the scale $t$, both above and below the zero-point, to which the mercury rises and falls in the two channels of the gage must be added. Thus if the scale $t$ be divided into inches and tenths of an inch the rising of the mercury in the right-hand channel of the gage one inch would denote a difference of vacuum suction of two inches, as the mercury in the opposite arm would correspondingly drop one inch. By dividing the scale $v$ on the indicator-slide $u$ to read twice the number of inches or fractions of an inch indicated on the scale $t$ in order to readily observe the amount of aeration going on one needs only to look at the scale on the indicator-slide. The slide, as already observed, is first to be set at zero, or the position indicated by the mercury when the valve is closed. The valve is then opened to the required amount of aeration desired. The working of the device when once adjusted is obviously automatic. By this construction it will be obvious that when the vacuum suction is dimished the air will not be sucked into and through the regulator so rapidly, in consequence of which a larger opening of the valve $h$ is required to give a uniform air-supply into the bottom of the tank to feed the liquid therewithin. In this case the spring will act upon the diaphragm and open the valve wider. On the other hand, if the vacuum suction is increased the velocity of the air entering and passing through the regulator will be greater, in consequence of which to preserve a uniform air-supply a smaller opening is required from the chamber $e$ into the channel $g$, and the increase of the vacuum suction will tend to close the valve $h$ to give the smaller opening desired. In this manner a constant and uniform air-supply may be secured, while the vacuum suction may fluctuate. Thus the amount of air supplied into the base of the tank may be made uniform, the vacuum suction and the spring being the two forces to secure the uniform air-supply under various fluctuations of the vacuum suction.

It will be noticed that air has heretofore been admitted into the bottom of the tank to aerate the contents of the tank by the outside air being drawn in through the pipes $a$ $a$ in consequence of the vacuum suction. The valve 15 being open, the air enters through the filter 7, wherein it has been purified, and passes through the air sight-feed 8, consisting of a "bubble-meter," and passes thence downward into the base of the tank. Heretofore the only means of regulating the amount of air thus supplied was by means of the valve 15; but this did not in any manner constitute an automatic regulation of the air-supply, since the air-supply was continuously fluctuating with fluctuations of the vacuum suction. By inserting, however, into the pipe $a$ below the air sight-feed my automatic regulator I am enabled to secure any given amount of aeration desired, the same being constant under any given adjustment of the spring tension upon the diaphragm of the regulator no matter what may be the fluctuations of the vacuum-pressure.

The air sight-feed 8 may be of any desired construction, usually consisting of a suitably-shaped glass vessel 19 partially filled with water, in which is immersed the lower end of a small pipe 20, communicating with the pipe $a$ at its upper end, and an additional small pipe or channel 21, communicating with the interior of the glass vessel at its upper end and leading into the pipe $a$, as shown in Fig. 7. The air passes through the pipe 20 and through the water in said vessel, causing bubbles to rise, in consequence of which the admission of air through the air sight-feed may be observed. In consequence of the air passing through the filter, and especially through the air sight-feed, the force of the vacuum suction is checked, and in consequence of the sizes of the pipe 20 and the channel 21 of the air sight-feed as customarily made the relative sizes of the channel $f$ and $g$ of the regulating mechanism $d$ is immaterial, the sizes of the pipe 20 and the channel 21 being customarily not greater than the size of the channel $g$ of the regulator.

In Fig. 5 I have shown a pump 17 connected with the branch $2^a$ of the vacuum suction-pipe.

After the operation of fermentation has terminated within the tank air is no longer required to be passed through the aerator, nor is there any further occasion for the vacuum within the tank. It will be obvious that by so closing the valve 15 and properly opening the valve 9 air will pass through the filter 7 upward through the upper portion of the pipe $a$ and through the pipe 10 into the top of the tank; but when the aerating apparatus is desired to be in action the three-way cock 9 is opened to produce vacuum in the tank, the pipe 10 communicating with the pipe $2^a$, the communication of the pipe 10 with the pipe $a$ being closed. The valve 15 then being opened, the regulating device accomplishes its function to regulate the amount of air admitted into the bottom of the tank notwithstanding any fluctuations of vacuum-pressure.

It will be perceived that no regulation of the vacuum-pressure itself is intended to be accomplished by applicant's invention.

I have shown in the drawings a pump attached to the pipe $2^a$, and it will be understood that a similar pump may be attached to the pipe $2^b$ to draw off the gas from the top of the tank.

What I claim as my invention is—

1. The combination with a fermentation apparatus comprising a tank, means to produce a desired degree of vacuum within the tank, and mechanism to supply air into the bottom of said tank, of an automatic regulator interposed in said mechanism to secure a uniform air-supply into the bottom of the tank.

2. The combination with a vacuum fermentation apparatus comprising a tank, means to produce a desired degree of vacuum within the tank, and mechanism for supplying air into the bottom of said tank, of an automatic regulator interposed in said mechanism to secure a uniform air-supply into the bottom of said tank under various fluctuations of the vacuum.

3. The combination with a vacuum fermentation apparatus provided with a tank and with mechanism for supplying air into the bottom of the tank, of an automatic regulator interposed in said mechanism to secure a uniform air-supply into the bottom of the tank under various fluctuations of the vacuum.

4. The combination with a vacuum fermentation apparatus provided with a tank and with mechanism for supplying air into said tank, of suction-actuated means interposed in said mechanism to secure a uniform air-supply into the bottom of said tank under various fluctuations of the vacuum.

5. The combination with a vacuum fermentation apparatus comprising a tank, and mechanism to supply air into the bottom of the tank, of automatically-actuated means interposed in said mechanism to secure a uniform admission of air into said tank.

6. The combination with a vacuum fermentation apparatus comprising a tank, and mechanism to supply air into the bottom of the tank, of adjustable automatically-actuated means interposed in said mechanism to govern the admission of air into said tank under various fluctuations of vacuum.

7. The combination with a vacuum fermentation apparatus provided with a tank and with mechanism for supplying air into the bottom of said tank, of means interposed in said mechanism actuated by the vacuum to secure a uniform air-supply into the bottom of the tank under various fluctuations of the vacuum.

8. The combination with a vacuum suction device of a vacuum fermentation apparatus provided with a tank, of mechanism for supplying air into the bottom of the tank, a regulator interposed in said mechanism to secure a uniform air-supply into the bottom of said tank under various fluctuations of the vacuum.

9. The combination with a vacuum suction device of a vacuum fermentation apparatus provided with a tank, of mechanism for supplying air into the bottom of the tank, and an automatic regulator interposed in said mechanism to secure a uniform air-supply into the bottom of the tank under various fluctuations of the vacuum.

10. The combination with a vacuum suction device provided with a tank, of mechanism through which air is supplied into said tank, an aerating-regulator interposed in said mechanism to secure a uniform air-supply into the bottom of the tank under various fluctuations of the vacuum suction.

11. The combination with a vacuum suction device provided with a tank, of mechanism through which air is supplied into the top and into the bottom of said tank, and an aerating-regulator interposed in said mechanism to secure a uniform supply of air into the bottom of the tank under variations of the vacuum suction.

12. The combination with a vacuum suction device of a vacuum fermentation apparatus provided with a tank, of a pipe through which air is admitted into the bottom of the tank, an aerating-regulator interposed in said pipe to secure a uniform air-supply under various fluctuations of the vacuum suction into the bottom of the tank, and an expansion-chamber in said pipe with which said regulator communicates.

13. The combination with a vacuum suction device of a vacuum fermentation apparatus provided with a tank, of mechanism through which air is supplied into said tank, a regulator interposed in said mechanism to secure a uniform air-supply to the bottom of said tank under various fluctuations of the vacuum suction, and a vacuum-gage communicating with said regulator.

14. The combination with a vacuum fermentation apparatus comprising a tank, means to produce a desired degree of vacuum in said tank, and mechanism to secure admission of air into the top and into the bottom of said tank at the will of the operator, of an automatic regulator interposed in said mechanism to secure a uniform supply of air into the bottom of the tank under various fluctuations of the vacuum.

15. The combination with a vacuum suction device of a vacuum fermentation apparatus provided with a tank, of a pipe communicable into the top and into the bottom of the tank through which air may be admitted either into the bottom or into the top of the tank, means to control the communication of said pipe into the top of the tank, additional means to control the communication of said pipe into the bottom of the tank, means to supply air to said pipe, and an aerating-regulator interposed in said pipe to secure a uniform air-supply into the bottom of the tank under various fluctuations of the vacuum suction, when the communication of said pipe into the top of the tank is closed and the communication of said pipe into the bottom of the tank is open.

In testimony whereof I sign this specification in the presence of two witnesses.

FRANTZ BROGNIEZ.

Witnesses:
N. S. WRIGHT,
J. M. POLAND.